US008445059B2

(12) United States Patent
DiGiovanni et al.

(10) Patent No.: US 8,445,059 B2
(45) Date of Patent: May 21, 2013

(54) ACCELERATED AGING OF PHOSPHORUS-DOPED OPTICAL FIBERS

(75) Inventors: David J. DiGiovanni, Mountain Lakes, NJ (US); Robert Lingle, Jr., Alpharetta, GA (US); Michael LuValle, Morristown, NJ (US); George E. Oulundsen, Belchertown, MA (US); Durgesh Shivram Vaidya, Southbridge, MA (US)

(73) Assignee: OFS Fitel, LLC, Norcross, GA (US)

( * ) Notice: Subject to any disclaimer, the term of this patent is extended or adjusted under 35 U.S.C. 154(b) by 480 days.

(21) Appl. No.: 12/231,781

(22) Filed: Sep. 5, 2008

(65) Prior Publication Data

US 2009/0214769 A1    Aug. 27, 2009

Related U.S. Application Data

(63) Continuation-in-part of application No. 12/072,433, filed on Feb. 26, 2008.

(51) Int. Cl.
*G02B 6/02*    (2006.01)

(52) U.S. Cl.
USPC ........................................ 427/163.2; 427/162

(58) Field of Classification Search ............... 427/163.2, 427/162, 164, 165; 385/123; 65/385, 426, 65/376, 424
See application file for complete search history.

(56) References Cited

U.S. PATENT DOCUMENTS

| | | | | |
|---|---|---|---|---|
| 4,339,173 A * | 7/1982 | Aggarwal et al. | ............. | 385/142 |
| 4,804,247 A * | 2/1989 | Kyoto et al. | ................. | 385/142 |
| 6,499,318 B1 * | 12/2002 | Lemaire et al. | ................. | 65/379 |
| 6,580,854 B1 * | 6/2003 | Enomoto et al. | ................. | 385/37 |
| 7,421,174 B2 | 9/2008 | Fleming, Jr. et al. | | |
| 2005/0123255 A1 * | 6/2005 | Kashihara et al. | ............ | 385/123 |
| 2005/0268664 A1 * | 12/2005 | Jang et al. | ........................ | 65/426 |
| 2007/0092191 A1 | 4/2007 | Koilakh et al. | | |
| 2009/0211303 A1 * | 8/2009 | DiGiovanni et al. | ............ | 65/425 |
| 2009/0214769 A1 | 8/2009 | DiGiovanni et al. | | |

FOREIGN PATENT DOCUMENTS

| | | |
|---|---|---|
| EP | 0673895 | 9/1995 |
| JP | 60090852 | 5/1985 |
| JP | 2001255564 | 9/2001 |
| WO | WO 2007069275 A2 * | 6/2007 |

OTHER PUBLICATIONS

Presby and Kaminow, Binary silica optical fibers: refractive index and profile dispersion measurements, Dec. 1976, Applied Optics, vol. 15 No. 12, 3029-3036.*

Non-Final Office Action in U.S. Appl. No. 12/072,433, mailed Apr. 15, 2011, 15 pgs.

(Continued)

*Primary Examiner* — Dah-Wei Yuan
*Assistant Examiner* — Nga Leung V Law
(74) *Attorney, Agent, or Firm* — Law Offices of Peter Wilde (57) ABSTRACT

Adverse hydrogen aging limitations in multiply-doped optical fibers are overcome by passivating these optical fibers using a deuterium passivation process. This treatment essentially pre-reacts the glass with deuterium so that the most active glass sites are no longer available to react with hydrogen in service. Optical fibers of main interest are doped with mixtures of germanium and phosphorus. Optimum passivating process conditions are described.

7 Claims, 4 Drawing Sheets

Time

OTHER PUBLICATIONS

Kaminon, I. P. et al., "Profile synthesis in multicomponent glass optical fibers", *Applied Optics,* vol. 16, No. 1 Jan. 1977, 108-112.

Lemaire, Paul J., "Reliability of optical fibers exposed to hydrogen: prediction of long-term loss increases", *Optical Engineering,* vol. 30, No. 6 Jun. 1981, 780-789.

Luvalle, M. J. et al., "Kinetic modeling of hydrogen induced degradation in erbium doped fiber amplifiers", *SPIE* vol. 3848, 260-270.

Olshansky, R., "Multiple-α index profiles", *Applied Optics,* vol. 18, No. 5 Jan. 1979, 683-689.

Presby, H. M. et al., "Binary silica optical fibers: refractive index and profile dispersion measurements", *Applied Optics,* vol. 15, No. 12 Dec. 1976, 3029-3036.

\* cited by examiner

ACCELERATED AGING OF PHOSPHORUS-DOPED OPTICAL FIBERS

RELATED APPLICATION

This application is a Continuation-In-Part of application Ser. No. 12/072,433, filed Feb. 26, 2008.

FIELD OF THE INVENTION

This invention relates to multimode fiber optimized for high capacity transmission around 850 nm as well as across wider bandwidths, and optical fiber transmission systems employing that fiber. More specifically it relates to methods for determining conditions for passivation of multiply-doped optical fibers to the effects of hydrogen.

BACKGROUND OF THE INVENTION

While single-mode fiber is a very efficient, low loss, lightwave transmission medium, and therefore used widely in applications like long haul communications where very low loss is a requirement, multi-transverse-mode optical fiber (hereinafter multimode fiber) fiber has an established status for short haul applications, and specialty fibers. For example, Local Area Network (LAN) applications have traditionally been based on low cost multimode fiber based systems. Such systems enable low cost by utilizing serial transmission, loose alignment tolerances between source and fiber end, and large alignment tolerances within connections and splices. To serve these applications effectively, the industry has set a standard for minimum acceptable transmission distance, and minimum optical fiber performance for that distance. The distance in current use is 300 meters for a single in-building optical link. In-building optical links comprise the vast majority of optical links in use today.

As data rates have increased to 10 Gb/s, the reach of traditional graded index multimode fibers is limited to distances of only 26 to 33 meters, using low cost multimode based serial systems.

In response to the need for faster transmission (10 Gb/s) rates over 300-m of MMF, the industry has responded and standardized a number of solutions. However, all of these solutions are unique and optimized for one wavelength. For example 10 GBE-SR is optimized for operation at 850-nm while 10 GBE-LX4 is optimized for operation at 1300-nm.

As the bandwidth demand continues to grow, it will be necessary to develop MMF that will transmit at speeds faster than 10 Gb/s. Likely, transmission rates are 40 and 100 Gb/s. Currently, a number of possible solutions are being considered. One solution is a 12×10 MMF parallel solution, where each of 12 fibers transmits at 10 Gb/s for a total transmission rate of 120 Gb/s over 12 fibers. Another possibility being considered is a wavelength division multiplexing (WDM) solution over MMF. It has been shown feasible that using current premium MMF one can transmit 10 Gb/s over 4 wavelengths over one fiber for a total transmission rate of 40 Gb/s. However, because current premium MMF are optimized at one wavelength (850-nm) and exhibit their peak bandwidth at one wavelength, expanding a WDM solution to more than 4 wavelengths with each channel transmitting 10 Gb/s is not currently possible.

Thus multimode fibers are needed that are optimized across broad wavelength ranges, coupled with appropriate laser launch conditions, for wavelengths to at least 300 meters, and data rates at 1, 10, and 100 Gb/s. The objective is to design fibers that maintain the present low cost for 1 or 10 Gbps at 850 nm, while opening up other wavelength bands for CWDM of 10 and 20 Gbps transmission. Ideally, one would like to transmit at least 10 wavelengths each operating at 10 Gb/s or faster for a total transmission rate of at least 100 Gb/s over a single MMF.

We have designed a new class of multimode optical fibers optimized for operation across broad wavelength ranges. These are aimed at applications using 1, 10 and 100 Gb/s data rates at 850 nm, as well as WDM solutions between 800 and 1300-nm at lengths of up to at least 300 meters.

The improved multimode optical fibers have cores doped with aluminum and/or phosphorus. In preferred embodiments they are doped with germanium and phosphorus, or germanium and aluminum. Optical fibers with these multiply doped cores are shown to provide the optical transmission qualities necessary to meet new standards for short haul optical fiber links. More details on these multiply doped optical fibers are set forth in U.S. application Ser. No. 11/511,174, which is incorporated by reference herein.

However, we have also observed that, while these optical fiber designs provide very effective solutions for low cost, high performance, multimode fiber applications, some optical fibers with phosphorus and/or aluminum doping have high sensitivity to hydrogen contamination. Thus the long term aging qualities of fiber doped with phosphorus and/or aluminum may limit the effectiveness of these optical fibers for some applications, unless a solution can be found. We have identified a solution in the present invention.

SUMMARY OF THE INVENTION

In response to the observations and discoveries just outlined, we propose to overcome the adverse hydrogen aging limitations by passivating these optical fibers using a deuterium passivation process. This treatment essentially pre-reacts the glass with deuterium so that the most active glass sites are no longer available to react with hydrogen in the field.

However, passivation with deuterium often increases the initial attenuation of the fiber and for some fiber types or certain regimes of passivation, the resulting fiber can have significantly higher attenuation at end of life than an untreated fiber. Loss caused by both passivation and hydrogen exposure during life varies greatly depending on glass composition, so commercially important fiber types, like single mode fiber, erbium doped fiber and multimode fiber, all behave differently. Optimum passivation conditions exist, but because the theory of defect passivation is not well understood, choice of passivation conditions has not been well-founded.

To advance the technology of deuterium passivation, a new theory of kinetics has been developed which allows improved prediction of fiber loss due to passivation and during installation lifetime. This theory allows optimization of passivation conditions of exposure temperature, exposure pressure and exposure time. An important aspect is calculation of hydrogen and deuterium activity and a method for balancing loss between the deuterium and hydrogen. That allows new methods for deuterium passivation of optical fibers to be defined.

BRIEF DESCRIPTION OF THE DRAWING

The methods may be more easily understood with the aid of the drawing, in which.

DETAILED DESCRIPTION

A traditional graded-index multimode fiber has a quasi-parabolic refractive index profile that causes the modes of the fiber to travel at close to the same speed, minimizing modal dispersion and giving maximum bandwidth at a particular wavelength. Away from that wavelength, the propagation velocity of the fiber modes becomes different. At wavelengths longer than optimum wavelength, higher order modes travel more slowly than the lower modes. At wavelengths shorter than the optimum, higher order modes travel faster than lower modes. Modal delays may also differ because of deviations from ideality in the profile in a real fiber.

The effect of modal delays changing rapidly away from the optimum wavelength can be understood by considering the phenomenon known as profile dispersion. Profile dispersion is determined by the composition of dopants. When only Ge dopant is used for multimode fiber, profile dispersion has larger variation, with a high slope across the broad wavelengths range (750~1600 nm). With less Ge, and mixing with other dopants such as P or Al, the profile dispersion becomes flatter and gives high bandwidth fiber over the wide wavelength range.

The inventive multimode fiber designs comprise multiply-doped fibers where, in general, a dopant such as Al or P is used to reduce the concentration of Ge required to achieve the requisite numerical aperture (NA) of the fiber. Fluorine may also be used in the fiber cladding to reduce the required amount of positive index dopant. Al and P raise the index of silica, while F depresses the index of silica. The dispersion of Ge-doped silica is generally higher than the dispersion of Al or P-doped silica, so that fiber modal dispersion is lower when $Al_2O_3$ or $P_2O_5$ displaces $GeO_2$ as the index-raising dopant. In general, dopant profiles of positive dopants such as Ge, Al or P oxides will be quasi-parabolic, characterized by the parameter "alpha" ($\alpha$) where a is typically approximately 2 (e.g., 2+/−0.3).

Fibers are described in which the dopant is solely comprised of Al, or solely of P, or the dopants are multiple combinations comprising of Ge and Al, or Ge and P, or Ge and Al and P. The cladding and/or the core of the fiber may also comprise F-doped glass, reducing the total amount of index-raising dopant necessary to achieve the target NA and changing the material dispersion of the glass. It may be advantageous to mix dopants for one or more of several reasons. For example, mixing the dopants will produce better modal dispersion than with either dopant alone; and scattering or aging losses may be improved in some cases in fibers with mixed dopants.

General approaches for improving multimode bandwidth by using multiple dopants have been known for many years. See, for example, Kaminow and Presby, AO, Vol. 16, No. 1, p. 108, January, 1977; R. Olshansky, AO, Vol. 18, No. 5, p. 683, January, 1979. However, these fibers have not achieved commercial success for various reasons. Much work was done on multiply doped fibers prior to the advent of laser launch, at a time when the requirements for high-speed transmission were not well understood. We describe specific fiber designs, as well as specific combinations of fibers and sources, based on new understandings, and which enable high-speed transmission over multiple wavelengths in novel and unique ways.

In theory, a single mode laser with a launch having similar loose tolerances would be a desirable low cost launch option (at the wavelength at which the fiber is optimized). However edge-emitting lasers with industrial reliability are not optimized for 850 nm, while 10 Gbps single mode and directly modulated Fabry-Perot (FP) or DFB lasers coupled to a 1300 nm optimized fiber have not been accepted by standards bodies in the past. Nonetheless, future applications of wideband fibers may beneficially use edge-emitting InP lasers in the range around 980 to 1120 nm for low cost transmission. For a perfect center launch, at very high cost to manufacture, a multimode fiber with no center defects would be inherently broadband, since the several lowest order modes have small differences in modal delay. However it is useful to consider loose tolerance coupling of a single mode laser to a multi-mode fiber for low cost, as well as to account for the effects of connector, which will launch away from the center as well. Two worst case connects near 7 micron offset can be approximated by a single 9 micron offset launch. We use the modal bandwidth of a 9 micron single mode offset launch as one metric of the expected performance of the inventive fibers described herein.

The multiply-doped fibers may have index profiles characterized by multi-alpha parabolic exponents to equalize mode dispersion as a function of launch mode power distribution, and/or with subtle features such as steps, depths, kinks, added to further suppress particular mode groups, and/or longitudinal periodic structures to increase mode mixing effects. The size of the fiber may be 62.5 um/125 um, 50 um/125 um, or other size. Smaller cores, with less core germanium concentration, may be preferred from the standpoint of lowering loss. The multiply-doped fibers have OFL bandwidth of >1200 MHz·km at 850 nm and >500 MHz·km at 1300 nm.

The multiply-doped glass compositions and optical fiber profiles discussed here are processed by conventional methods to form preforms, and to draw optical fiber.

In investigations of these multiply-doped optical fibers it was found that, while they provide exceptional optical characteristics, they are more susceptible than would be predicted to degradation due to hydrogen contamination. Degradation occurs as the result of well-known formation of water peaks that form as the result of hydrogen bonding. The water peaks (OH− bonds) absorb light in the typical wavelength range of the signal. Degradation becomes particularly severe when the concentration of phosphorus and/or aluminum exceeds 2%.

To overcome this, optical fibers with the compositions described are passivated by treating the optical fibers in a heated atmosphere of deuterium. The treatment conditions determine the effectiveness of the passivation treatment. The treatment conditions are essentially: time of treatment, concentration of deuterium and duration of external deuterium exposure, and treatment temperature.

We have analyzed the hydrogen contamination process in detail to enable determination of optimum passivation processes.

Figure 1:
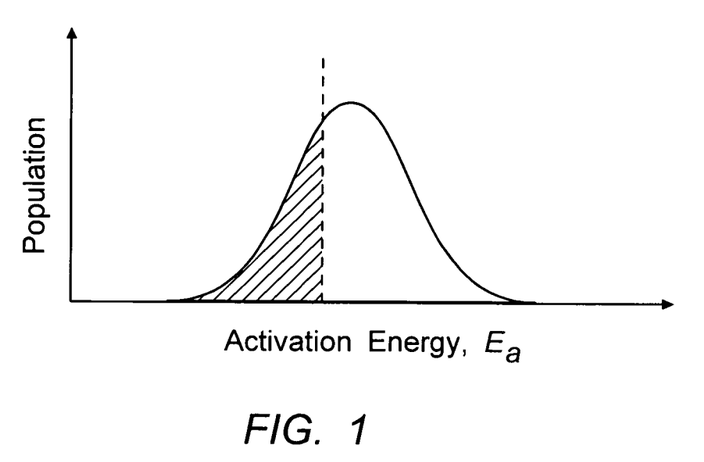
FIG. 1 illustrates the distribution of activation energies among reactive sites in the glass fiber.
Figure 2:
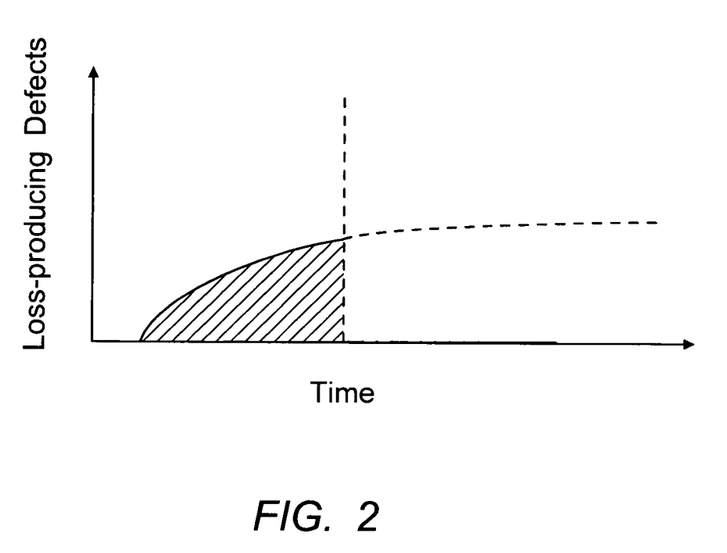
FIG. 2 is a representative plot showing growth in reacted sites with time.

Hydrogen contamination is essentially a three-stage process. First, hydrogen diffuses into the fiber from the surrounding material or atmosphere. Then, this interstitial hydrogen becomes an active form capable of reacting to form defects. Usually this transformation to an active form is a reversible process and can be modeled either as a splitting of the hydrogen molecules to form radicals or as an adsorption isotherm, similar to a Langmuir isotherm. Finally, the active form of hydrogen reacts with existing sites in the glass to form loss-causing defects. Data to date indicates that the reaction occurs with a broad distribution of activation energies. This is illustrated in FIG. 1, which shows the number density of sites with activation energy, $E_a$. Since the rate of reaction can be represented as rate~exp[$-E_a/kT$], sites with lowest activation energy are consumed first and the reaction rate gets progressively slower. The reaction is represented by the shaded region in FIG. 1, which indicates the population of defects that have reacted with available hydrogen due to exposure at some temperature for some time. As time progresses, more sites are consumed and the growth of the population of reacted sites grows to some asymptotic limit because there is a finite set of glass sites that hydrogen can occupy. The extent of reaction and creation of loss-producing defects grows with time, as illustrated in FIG. 2.

Optical fibers such as transmission fiber and erbium-doped fiber can be sufficiently sensitive to reaction with hydrogen at typical operating temperatures and hydrogen levels that the change in optical loss over time is unacceptable. To remedy this, passivation procedures have been developed to produce fibers that are more stable over time. Successful passivation reacts the lowest-lying sites and thereby slows the subsequent reaction at operating conditions without inducing unacceptable initial background loss. To reduce the initial increase in background loss during passivation, deuterium may be substituted for hydrogen. Since deuterium is chemically similar to hydrogen, the kinetics of reaction with available glass sites is also very similar. However, because of the increase in atomic weight, the absorption spectra associated with deuterium species in glass is radically different than hydrogen. In particular, the hydroxyl overtone around 1.38 microns in silica, which is responsible for most of the optical loss in the telecommunications window around 1.55 microns, is shifted away from the window. This reduces the impact on loss of reaction with deuterium. Thus passivation with deuterium can induce relatively little attenuation of the signal wavelength.

Figure 3:
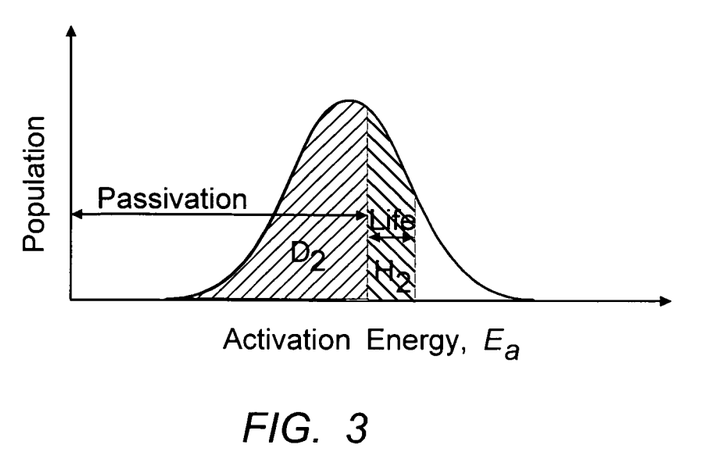
FIG. 3 is a plot showing the distribution of activation energies among reactive sites in a passivated, optical fiber.
Figure 4:
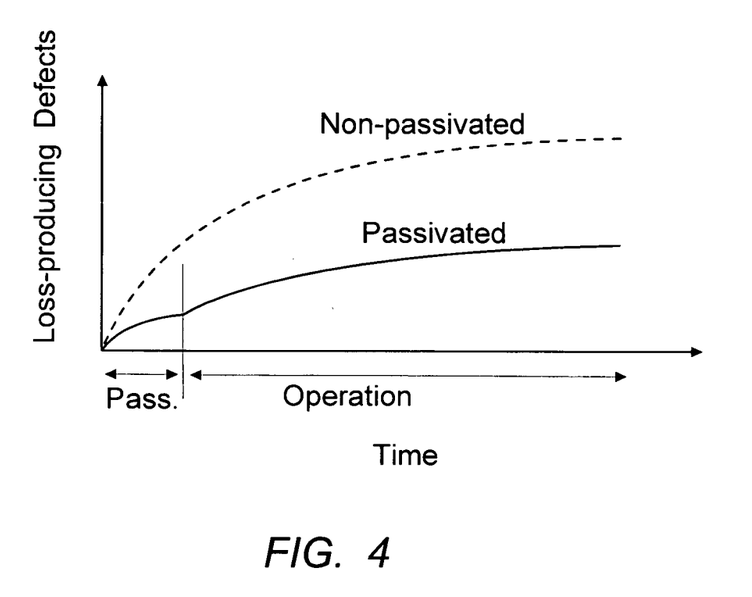
FIG. 4 is a plot similar to that of FIG. 2 comparing passivated and non-passivated optical fibers.

The effect of typical passivation is illustrated in FIGS. 3 and 4, which show a population of sites reacted with deuterium during passivation. In practice, the induced loss is small and can be accounted for prior to placing the optical fiber in service. In service, the hydrogen sites remaining (the sites that were not passivated) have higher activation energy than those consumed during passivation, so the reaction rate proceeds more slowly. The additional optical loss in service should therefore be small, despite the higher molar absorption of hydrogen. This renders the fiber much more stable over time than a non-passivated fiber.

Passivation essentially accelerates the consumption of the lowest-lying sites, using accelerated conditions, i.e., much higher temperature and gas pressure than anticipated in service, and fills the sites with species that are relatively lossless.

This behavior suggests that the increase in loss due to exposure of optical fiber to hydrogen or deuterium is dictated by the distribution of activation energies of the available defect sites and the history of time, temperature and hydrogen or deuterium activity. A simple approximate model of the contamination process is that the time for a given temperature-pressure condition can be scaled to produce a single mastercurve using the transformation:

$$E_a = kT \log(v[H^*]_t) \qquad (1)$$

where $E_a$ is activation energy, v is a frequency factor, k is Boltzmann's constant, T is absolute temperature, and $[H]^*_t$ is an integrated hydrogen activity term that includes diffusion into the glass, solubility of hydrogen in the glass, and the chemical activation of the molecular hydrogen over time (see e.g. SPIE V 3848, pp 260-271, LuValle et al., incorporated herein by reference). Creation of a mastercurve allows correlation of experimental data from accelerated testing over a wide range of temperatures, pressures and times, and enables accurate prediction at a different set of temperatures, pressures and times.

The concepts discussed can be used to allow accurate prediction of the growth of optical loss in a fiber during its service lifetime. Since the reaction with deuterium shifts the optical absorption of the reacted defects away from the wavelength of operation, the loss induced during passivation with deuterium is relatively small. Focus has therefore been on calculating the expected growth of loss during operation, and determining an appropriate level of passivation to attain adequate end-of-life characteristics. Any attenuation due to passivation has been relatively minor and treated as a necessary cost. Since typical passivation conditions may entail temperatures in excess of 100° C. for many hours, in some cases the passivation process is limited by coating degradation or simple fiber processing cost, rather than by induced optical loss.

However, we have discovered situations in which previous methods are inadequate in assuring suitable operation. In particular, for some of these situations the loss incurred during passivation can be excessively high. For example, recently developed multimode fibers (see application Ser. No. 11/511,174), with core compositions containing germanium and phosphorus, and/or aluminum and/or fluorine exhibit very high reactivity with hydrogen. This indicates a need for much higher degrees of passivation than that required for conventional Ge doped fibers. The result is a large increase the amount of deuterium reacted in the glass. In addition, where the intended operating wavelength range is broad, for example from 850 nm to 1300 nm, that wavelength range includes at least one $OD^-$ absorption peak. In that situation, loss induced during standard passivation can exceed that of a non-passivated fiber.

Other fibers exhibit similar excessive loss due to passivation, such as erbium doped fibers intended for exposure to harsh environments or high-reliability applications. These fibers may have high concentrations of aluminum.

In these instances, a balanced approach is desirable to minimize the combination of loss from passivation and operation. To accomplish this, the underlying reaction dynamics must be understood and utilized.

The analysis of the effects of passivation discussed above suggests that a given population of reactive sites can be consumed by reaction with hydrogen or deuterium through an infinite combination of gas pressure, exposure temperature and exposure duration. For example, at a fixed hydrogen pressure, a fiber held at high temperature for a short time will incur the same optical loss as a fiber held at low temperature for a long time. This occurs because there is a single population of reactive sites with a single distribution of activation energy, and equivalent treatments consume the same population of reactive glass sites. This behavior has been verified for a several glass types.

In some cases, this behavior does not hold if there is more than one population of sites and the populations have different distributions of activation energies. We have found such instances in studying the effects of ionizing radiation on complex glass systems.

Figure 5:
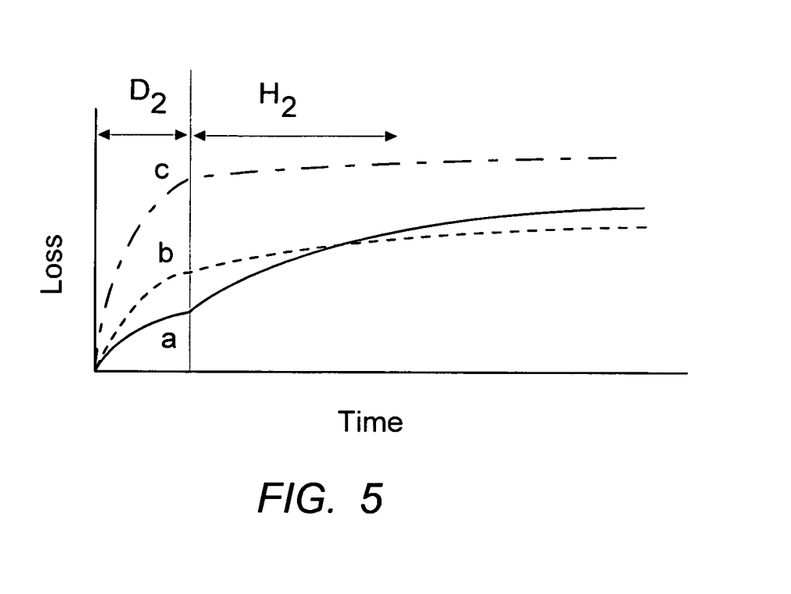
FIG. 5 is a plot of loss vs. time comparing results for three different hypothetical conditions of passivation with deuterium, followed by operation in hydrogen for long time.

Although the same population of reactive sites can be accessed by multiple combinations of pre-treatment and operation, the final optical loss may be different due to the fact that the optical loss induced by hydrogen is much greater than by deuterium. Thus, for glasses and chemical mechanisms in which there is effectively a single population of reactive sites, the above discussion implies that if the duration and conditions of lifetime operation are defined, then passivation conditions can be optimized to minimize the amount of optical loss at end of life. This is illustrated in FIG. 5, which shows the result of two different hypothetical conditions of passivation with deuterium, followed by operation in hydrogen for long time. In curve (a), the fiber was treated at low temperature and, although the initial loss during passivation was low, after long service time the total attenuation grows considerably. Curve (b) shows more aggressive passivation (at higher temperature, for example), resulting in more incurred passivation loss, but subsequent reactivity has been slowed sufficiently so that after long service time the total incurred loss is lower than in curve (a). Yet more aggressive passivation in curve (c) renders the fiber quite stable to degradation in service, but this does not compensate for the high passivation loss, and the end-of-life loss is higher than curve (b). Thus it is shown that the passivation process can be too severe as well as too mild. While it would normally be assumed that an effective passivation process may only need to account for a passivation threshold, the afore-stated understanding establishes that optimum passivation conditions have both a maximum as well as a minimum. Thus in designing a deuterium passivation process it is desirable to calculate not only the lower limits of process conditions but the upper limits as well.

In addition to the difference in optical loss magnitude and spectrum caused by deuterium and hydrogen, the rate of diffusion of molecular species through the polymer and glass cladding differ significantly. In contrast, the difference in the kinetic behavior between deuterium and hydrogen is relatively minor. Each of these differences can be incorporated with appropriate scaling in the mastercurve. A typical procedure is to perform a set of experimental tests using accelerated conditions of temperature, pressure and time to determine the mastercurve, from which the $[H^*]_t$ function can be determined. Use of the $[H^*]_t$ function then allows the temperature-pressure-time conditions for deuterium passivation to be determined to minimize end-of-life loss Note that once $[H^*]_t$ is known as a function of temperature and pressure, one can use the measured change in optical loss to back-calculate the concentration of hydrogen to which the fiber was exposed in the field. This can be a useful tool for monitoring fiber installations or devices to detect equipment problems or imminent failure.

One aspect of the invention is an experimental protocol for determining $[H^*]_t$. The diffusion constant and solubility of $H_2$ in silica as a function of temperature and pressure can be obtained from the literature (e.g. Lemaire, Optical engineering, June 1981, V 30, no 6, pp 781 equations 2 and 3). Thus we can find the local concentration of $H_2$ in the fiber and using the experimentally measured growth of loss over time, the hydrogen activity can be determined.

We have found that the chemical activation of hydrogen is strongly dependent on glass composition. With significant doping of elements from column IIIA of the periodic table, activity is dominated by the dissociation of hydrogen into hydrogen radicals. For example, aluminum doping reduces the activation energy for dissociation from 4.48 eV to ~1 eV. This catalysis is probably the result of the ability of aluminum (like boron) to hybridize across its empty orbital to create 3 center bonds.

Alternatively, in fibers without IIIA elements, the dominant activity is adsorption of $H_2$ directly onto the loss-generating site with subsequent splitting of the hydrogen-hydrogen bond. In this case, the activity has the form of an adsorption isotherm, with general form $$\frac{1+A}{1+\frac{A}{B\times[H_2]}}$$

with $[H_2]$ determined directly from the diffusion and solubility, and A and B estimated experimentally.

The general form of hydrogen-induced darkening in a fiber can be described by the system of equations:

$$\frac{d[H_2]}{dt} = -k_1[H_2] + k_2[\dot{H}]^2 \qquad (2)$$

$$\frac{d[\dot{H}]}{dt} = k_1[H_2] - k_2[\dot{H}]^2 - \sum_{i=1,\ldots,n} k_{3i}[\dot{H}]$$

$$\frac{d[D_i]}{dt} = -k_{3i}[D_i]\left(p[\dot{H}] + (1-p)\frac{1+A}{1+\frac{A}{B\times[H_2]}}\right),$$

$$i = 1, \ldots, n$$

$$\frac{d[L_\lambda]}{dt} = \alpha_\lambda \sum_{i=1,\ldots,n} k_{3i}[D_i]\left(p[\dot{H}] + (1-p)\frac{1+A}{1+\frac{A}{B\times[H_2]}}\right)$$

where $$k_j = v_j\exp\left(-\frac{E_{aj}}{kT}\right), j = 1, 2$$

$$k_{3i} = v_3\exp\left(-\frac{E_{a3i}}{kT}\right), i = 1, \ldots, n$$

Here $[\dot{H}]$ is the concentration of hydrogen radicals, the v terms are frequency factor for the Arrheniuos relation, k is Boltzmann's constant, T is absolute temperature, $[L_\lambda]$ is the optical loss per unit length at wavelength $\lambda$, and $D_i$ terms represent the population of sites in the glass that can eventually become lossy. The concentration of the $D_i$ terms at time 0 gives the weights for the activation energies in the distribution of activation energies. The parameter p allows relative weighting of the two forms of activity.

The model above can be fit based on experimental data from appropriate experiments to estimate the activity. Subsequent experiments are helpful in refining the activity to improve the accuracy of long-term prediction.

Example

Figure 6:
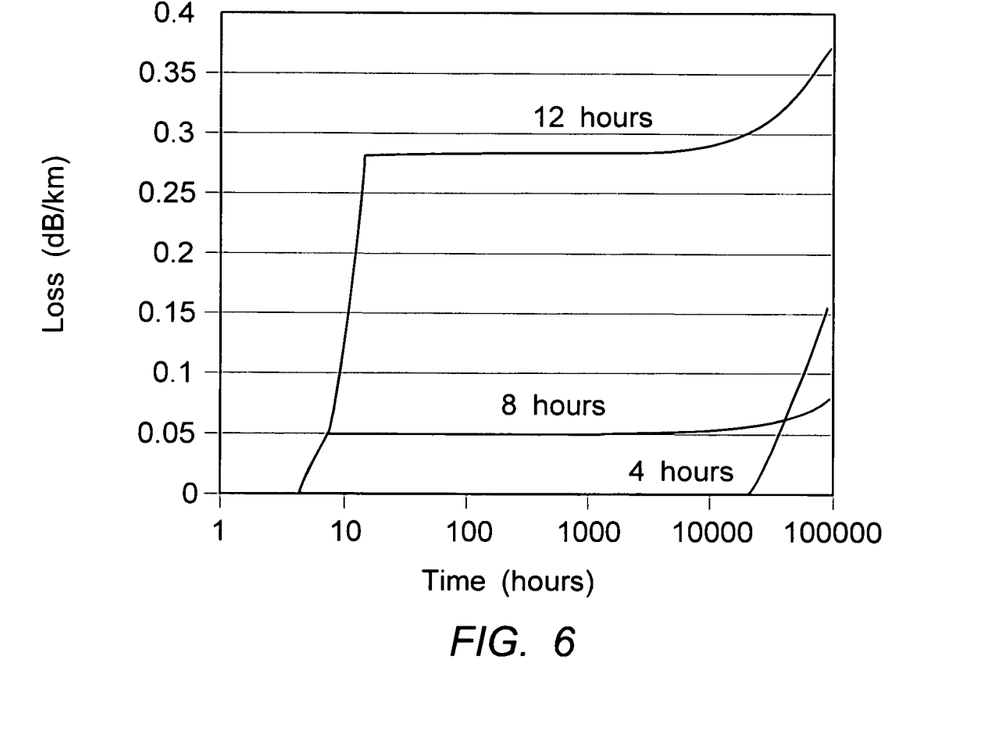
FIG. 6 is a plot of loss vs. time giving comparative simulation data for different treatment times.

To demonstrate the effective application of the concepts described above a multimode fiber was fabricated with a Ge—P doped core. The optical fibers were treated in a heated furnace with an atmosphere of deuterium mixed with nitrogen. Nominal overall pressure was 1 atmosphere. After several experiments were conducted to determine hydrogen and deuterium activity and appropriate values of v in equation (1) above, simulations were performed to predict fiber end-of-life performance after passivation at 72 C and 1 atm of deuterium for different times. The exposure durations of 4, 8 and 12 hrs are plotted in the FIG. 6. In service conditions were assumed to be 25 C and $10^{-4}$ atm of hydrogen, with an operating lifetime of 10 yrs. The short passivation (4 hrs) is inadequate for reacting a sufficient population of reactive sites while the long passivation (12 hrs) is excessive. Minimum end-of-life loss is found at passivation duration of 8 hrs.

Based on this and other experiments an optimum range for the three treatment parameters was established. The preferred treatments comprise an initial treatment in heated deuterium, followed by a drive-in anneal in an inert gas, e.g., nitrogen. In the initial treatment the deuterium may be diluted with inert gas to the desired deuterium pressure. The inert gas drive-in allows diffusion of absorbed deuterium through the fiber, and allows the desired reactions to occur. The pressure of deuterium is preferably 0.25 to 0.75 atmospheres and the preferred overall treatment period is in the range 18 to 30 hours, with a deuterium treatment period of two to six hours. The corresponding treatment temperature range is 65 to 100 degrees C.

From the standpoint of practical commercial production and other considerations recommended process conditions are 0.4+/−0.2 atmospheres of deuterium for 3+/−1 hours, followed by 21+/−5 hours of heating in an inert atmosphere with the temperature in the range 82-92 degrees C.

Figure 7:
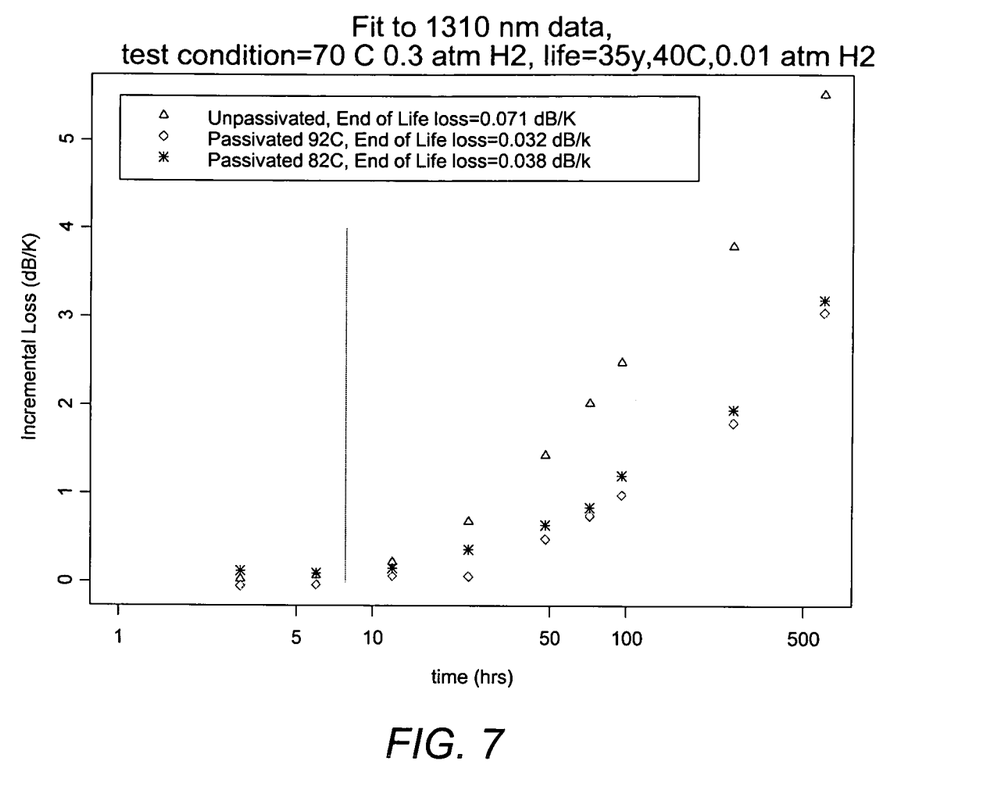
FIG. 7 shows experimental data comparing unpassivated and passivated optical fiber at accelerated conditions, with a projection to operating conditions.

FIG. 7 provides raw data measured from unpassivated fiber vs passivated fiber, measured at 1310 nm, at an accelerated condition of 70° C., 0.3 atmosphere $H_2$. The optical fiber composition was 14% $P_2O_5$, 13% $GeO_2$, 73% essentially $SiO_2$. The horizontal axis is time at the accelerated condition in hours. The vertical axis is incremental loss in dB per kilometer. The vertical line at approximately 5 hours is a rough estimate of the time at the accelerated condition corresponding to end of life for exposure at 40 C., 35 years, 0.01 atm hydrogen. The estimate of end of life loss for each fiber is given in the legend. The effect of passivation can be clearly seen as the unpassivated fiber (triangle symbol Δ) stays strictly above the passivated fibers once the noise floor of the measurement is exceeded.

The doping levels of optical fibers that may be treated by the processes described herein may vary substantially. Compositions of primary interest, and those that are most susceptible to excessive loss from deuterium passivation, are silica-based optical fibers co-doped with $GeO_2$ and $P_2O_5$. In general, the mol ratio of $GeO_2$ to $P_2O_5$ may vary widely, for example, from 0.5 to 10. The overall dopant concentration typically varies from 15 to 32 mol %, remainder $SiO_2$. The phosphorus content is generally in the range 2 mol % to 20 mol %. Specific compositions of interest are $GeO_2$ 20%+/−3% with $P_2O_5$ 3%+/−1%, and $GeO_2$ 13%+/−3% with $P_2O_5$ 14%+/−3%.

Multimode fiber that is the subject of the foregoing description can be recognized as generally having a relatively large core diameter, typically greater than 10 microns. This property distinguishes the optical fiber from single mode optical fiber that typically has a core diameter of 6 microns or less.

In concluding the detailed description, it should be noted that it will be obvious to those skilled in the art that many variations and modifications may be made to the preferred embodiment without substantial departure from the principles of the present invention. All such variations, modifications and equivalents are intended to be included herein as being within the scope of the present invention, as set forth in the claims.

The invention claimed is:

1. A method for passivation of an optical fiber, comprising:
applying a first passivation step to the optical fiber by treating the optical fiber in a first heated and pressurized environment containing deuterium for a first period of time;
applying an operation step to the optical fiber by operating the optical fiber in an atmosphere comprising hydrogen during an operation time, the first passivation step and the operation step resulting in a first loss-time curve;
wherein when the first loss-time curve is compared to a second loss-time curve that is derived from a second passivation step, the second passivation step comprising treating the optical fiber in a second heated and pressurized environment containing deuterium for a second period of time;
wherein the first passivation step is performed at a higher temperature than the second passivation step; temperature in the range of 65 degrees Celsius to 100 degrees Celsius; wherein the second passivation step is performed at a temperature less than 65 degrees Celsius; and
wherein the second passivation step is followed by performing the operation step in the atmosphere comprising hydrogen, such that:
a loss associated with the first loss-time curve during the first passivation step is greater than a loss associated with the second loss-time curve during the second passivation step;
the loss associated with the first loss-time curve exceeds the loss associated with the second loss-time curve during a first part of the operation step; and
the loss associated with the first loss-time curve is less than the loss associated with the second loss-time curve during a second part of the operation step in the atmosphere comprising hydrogen.

2. The method of claim 1, wherein the first heated and pressurized environment containing deuterium comprises a pressure range of 0.2-0.6 atmospheres of deuterium.

3. The method of claim 1, wherein is in the range of for 2-4 hours.

4. The method of claim 1, wherein applying the first passivation step further comprises the step of heating the optical fiber in an inert atmosphere for 16 to 26 hours at a temperature in the range of 82 to 92 degrees Celsius.

5. The method of claim 1, wherein the loss-time curve is determined using an activation energy of fiber defects which is determined by an expression:

$E_a = kT \log(v/[H^*]_t)$, wherein v is a frequency factor, k is Boltzmann's constant, T is absolute temperature and $[H^*]_t$ is an integrated hydrogen activity term.

6. The method of claim 1, wherein the first loss-time curve after the first passivation step does not intersect with a third loss-time curve that results from a third passivation step, the third passivation step being performed at a temperature above approximately 100 degrees Celsius such that the loss associated with the first loss-time curve is less than a loss associated with the third loss-time curve after the passivation step is completed and during a service lifetime of the optical fiber.

7. The method of claim 1, wherein the optical fiber is a multimode fiber.

* * * * *